March 26, 1935.  R. D. BAKER  1,995,629
FINE GRADING MACHINE
Filed March 14, 1932   12 Sheets-Sheet 1.

Fig. 1.

Inventor
Robert D. Baker
By Rudolph **** 
Attorney.

March 26, 1935.　　　R. D. BAKER　　　1,995,629
FINE GRADING MACHINE
Filed March 14, 1932　　12 Sheets-Sheet 3

Inventor
Robert D. Baker
Attorney.

March 26, 1935.　　　R. D. BAKER　　　1,995,629

FINE GRADING MACHINE

Filed March 14, 1932　　12 Sheets-Sheet 4

March 26, 1935. R. D. BAKER 1,995,629
FINE GRADING MACHINE
Filed March 14, 1932 12 Sheets-Sheet 6

Inventor
Robert D. Baker
By Rudolph [illegible]
Attorney

March 26, 1935.  R. D. BAKER  1,995,629
FINE GRADING MACHINE
Filed March 14, 1932  12 Sheets-Sheet 7

Inventor
Robert D. Baker
Attorney.

Patented Mar. 26, 1935

1,995,629

UNITED STATES PATENT OFFICE 1,995,629

FINE-GRADING MACHINE

Robert D. Baker, Birmingham, Mich.

Application March 14, 1932, Serial No. 598,735

23 Claims. (Cl. 37—108)

This invention relates to improvements in machines for preparing an accurate road grade such as is required to receive and support a pavement of concrete or other material.

Machines of this type are ordinarily termed subgrading or fine-grading machines and are generally mounted for travel on the side forms of a pavement strip following the completion of the rough-grading which is done by means of plows, harrows, road-graders or scrapers and similar earth moving equipment to remove surplus earth from high spots, fill in hollows, remove tree roots, boulders and the like, the fine-grading machines being intended to remove the surplus earth layer left to overlie the predetermined fine-grade plane.

The main object of the present invention is to provide a grading machine which is adapted to break up the last-mentioned earth layer in advance of cutting blades or other earth undercutting means extending over the entire width of the pavement strip or a part thereof and parallel with the fine-grade plane and disposed either in register with or slightly below the latter to produce an accurate plane of severance between the overlying earth layer and the said fine-grade plane or a slightly lower and parallel plane.

Another object of the invention resides in providing mechanism for breaking up the earth layer in advance of the said cutting blades which penetrate said layer from the surface to a predetermined depth and move loose earth toward the said cutting blade or in a direction opposite that of travel of the machine, thereby to provide a movement of loose earth toward a line of cleavage occurring along the cutting blade transversely of the pavement strip and also provide longitudinal lines of cleavage in the earth layer which will materially reduce the normal resistance to progress of the cutting blade or undercutting device.

In accomplishing the foregoing object of the invention, the advantage of lessening resistance to travel of the machine is also attained, and in certain classes of soil, this is extremely important, for instance, in clay, hard-pan, and the like which may become very hard or tough after completion of the rough-grading operations under the influence of rain and sun preceding the fine-grading operations.

The present invention also contemplates the embodiment of the invention in a machine equipped with tractor chains at opposite sides thereof for cutting an initial narrow road or pavement strip to a predetermined grade plane in instances where the nature of the paving material to be used does not require its confinement between side-forms and, in many instances, to provide such a graded strip without resort to preparatory rough-grading.

The present invention may be said to constitute improvements upon the machines illustrated and described in and by my Patent Nos. 1,653,333 1,768,657, and 1,939,289 and my pending application for patent, Serial No. 580,541.

Suitable embodiments of the present invention are illustrated in the accompanying drawings wherein.

The machine of the present invention, as illustrated in Figs. 1 to 16 inclusive, is in many respects substantially identical with the machine illustrated and described in the last above-mentioned pending application for Letters Patent, and more particularly with respect to the details of construction of the propelling mechanism and the earth conveying mechanism.

The main distinctions between the machine of this invention and that of the said application last referred to, lies in the details of construction of the earth manipulating mechanisms disposed at the front of the machine and in the provision of earth tamping mechanism at the rear end of the machine.

The machine frame is composed of structural steel units, mainly channel-bars and angle-bars, including side rails 1, a front channel-bar 2, a pair of rear channel-bars 3 and 4 arranged below and in supporting relation to the side rails 1 to which they are suitably secured.

The said frame is carried by the flanged wheels 5 which are adapted to travel on the side-forms 6 bordering the pavement strip to be fine-graded.

Means are provided for raising and lowering the said frame relatively to the wheels 5 for the purpose of varying elevation of the earth manipulating mechanisms with respect to the crowns of the side-forms 6 which vary in height according to the specified thickness of the side edges of the pavement slab to be laid between the side-forms.

The machine may be propelled in any suitable manner but in the instance illustrated, the propelling mechanism consists of a pair of cable wind-up drums 7 which are suitably geared to the engine 8 for slow rotation to take up cables suitably anchored to the side-forms 6 or otherwise in advance of the machine.

As the propelling mechanism constitutes no part of the present invention, a detailed description thereof is omitted. This applies also to the means for raising and lowering the machine frame relatively to the side-forms 6; to the earth conveying and elevating mechanism including sprocket chains 9 disposed between the channel-bars 3 and 4 and to the earth smoothing devices 10 carried by the channel bar 4.

The essentially novel features of the present invention reside in the mechanism at the front of the machine for breaking up the earth crust or layer overlying the ultimate fine-grade plane in such a manner as to avoid resistance to progress of the machine and as to cause the same to promote such progress and relieve the associated earth undercutting means of undue stress and strain; in the provision of a specific type of secondary or undercutting mechanism; in the provision of the two types of said mechanism which may be said to be opposed to each other and, therefore, to co-operate with each other very efficiently; and, in the provision of earth tamping mechanism for co-operation with the foregoing earth manipulating mechanisms and the conveying and elevating mechanism to provide a very firm and accurate fine-grade to receive and support the paving material.

The engine shaft 11 is geared to a countershaft 12 by means of chain and sprocket wheel gearing 13—14 or in any other suitable manner. The countershaft 12 is, in turn, geared to a shaft 15 carrying a series of eccentrics 16 and which, therefore, is hereinafter referred to as the eccentric shaft 15. Both shafts 12 and 15 are parallel with the channel-bars 2 and 3 and are disposed between the same. These shafts are journalled in bearings carried by the side rails 1 and intermediate frame members 17 parallel with the said side rails.

An inverted channel-bar 18 underlies the shaft 12 and is carried by the brackets 19 mounted on the front face of the channel-bar 3 at regular intervals. Each of the said brackets 19 (Fig. 12) is equipped with a bearing 20 for the shaft 12 and with guide rollers 21 and 22 for the said channel-bar 18, the rollers 21 being horizontally disposed and rotatable on pins 23 extending through the depending arm 24 disposed at the outer end of the portion or arm of the bracket 19 which carries the bearing 20. The said rollers 22 are vertically disposed and are rotatable on pins 25 mounted in flanges 26 of the said brackets 19.

The channel-bar 18 is equipped with downwardly projecting arms 27 arranged in pairs. Each pair of the said arms 27 carries a shoe 28, and each shoe 28 carries a cutting blade 29. The said arms 27 are arranged to project forwardly and downwardly at an angle of about forty-five degrees (see Fig. 2) and the shoes 28 are also disposed at an incline.

Figure 12:
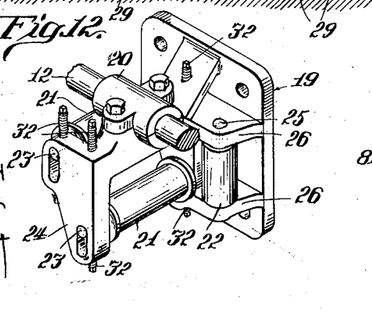
Fig. 12 is a perspective view of a casting provided with a shaft bearing and with guide means for a reciprocable bar of the machine.
Figure 14:
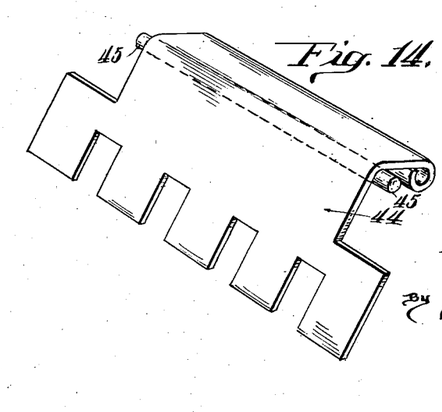
Fig. 14 is a perspective view showing a loose-earth shifting member of the machine.

Interchangeable blocks or plates 30 are interposed between the flanged upper ends of the arms 27 and the web of the channel-bar 18 and are secured in place by the bolts 31 which secure the arms 27 to said bar 18. The plates 30 are varied in number and thickness, as desired, to vary the elevation of the shoes 28 with respect to said bar 18. The latter and the cutting edges of the blades 29 define an arc coinciding with that of the ultimate fine-grade plane. The latter is usually arcuate and varies somewhat in different localities so that, in order to bring the said cutting edges of the blades 29 into accurate alignment with the predetermined contour of the fine-grade plane, it is necessary to flex the channel-bar 18 to adjust its curvature to coincide with that of the fine-grade plane. This is accomplished by means of the pairs of opposed set screws 32 engaged with the pins on which the rollers 21 are mounted as shown in Fig. 12.

The said shaft 12 is equipped with a cam 33 having a groove in which a roller on the channel-bar 18 engages, the said groove being of such shape as to effect reciprocation of the said channel-bar with a short stroke. The cutting blades 29 may be serrated or otherwise roughened so that they may act similarly to a saw.

The shaft 12 is suitably geared to the eccentric shaft 15. The eccentrics 16 on said shaft are equipped with strips for reciprocating the arms 34 which are L-shaped and include long arms 35. The said eccentrics are arranged in pairs and each pair actuates a pair of the said arms 35. The latter constitute the arms of substantially U-shaped members, each of which is equipped at its bight portion with sockets 36 in which earth scarifying members 37 are mounted and held by means of set-screws.

The said arms 35 (Fig. 2) are pivotally engaged between their ends with the lower ends of rocking supporting members 38 which are vertically slidable in bearings 39. The latter are pivotally mounted in brackets 40 secured to the channel-bar 2. A compression spring 41 is interposed between each bearing 39 and the head 42 at the lower end of each member 38 to maintain the same normally at the lower limit of its movement as determined by the nut 43 engaged with the threaded upper end portion of each member 38 and which engages the bearing 39 to limit the downward movement of the said member 38.

The shaft 15 rotates anti-clockwise and thus cooperates with the members 38 to cause the arms 35 to raise the scarifiers 37 simultaneously with a forward movement thereof. The scarifiers are then brought down into the earth and are drawn toward the channel-bar 2 so that they are active in scarifying during the last-mentioned movement and also then tend to move loose earth toward the channelbar 2.

Figures 2, 7, 8:
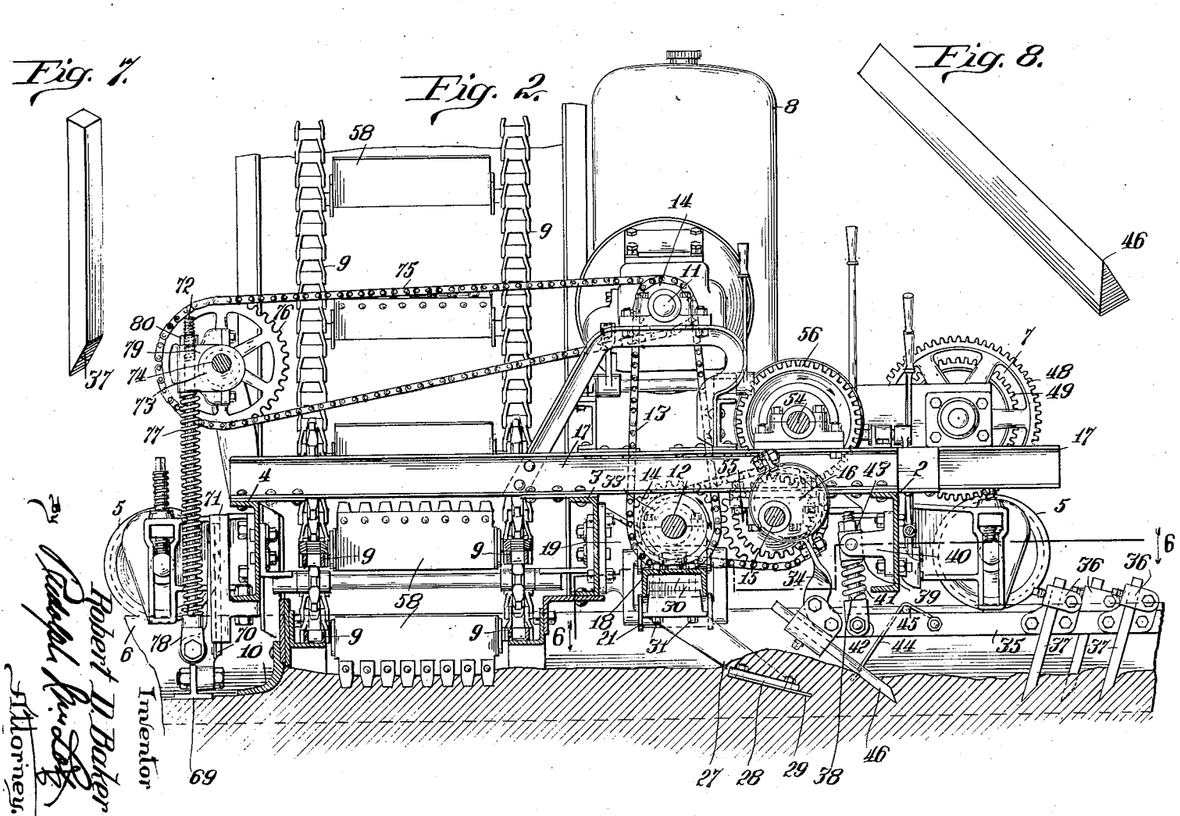
Fig. 2 is a vertical longitudinal section of the same on the line 2—2 of Fig. 1.
Figs. 7 and 8 are perspective views showing earth penetrating teeth employed.

Inverted L-shaped plates 44 are pivotally mounted on the arms 35 (see Figs. 2 and 14) and carry stop projections 45 at their elbows to rest upon said arms 35 to limit the pivotal movements of said plates in one direction. As shown in Fig. 2, the plates 44 are free to swing to ride over loose earth during forward movement of the arms 35 but will dig into the loose earth as soon as said arms begin reverse movement and will then move loose earth toward the cutting blades 29.

Figure 1:
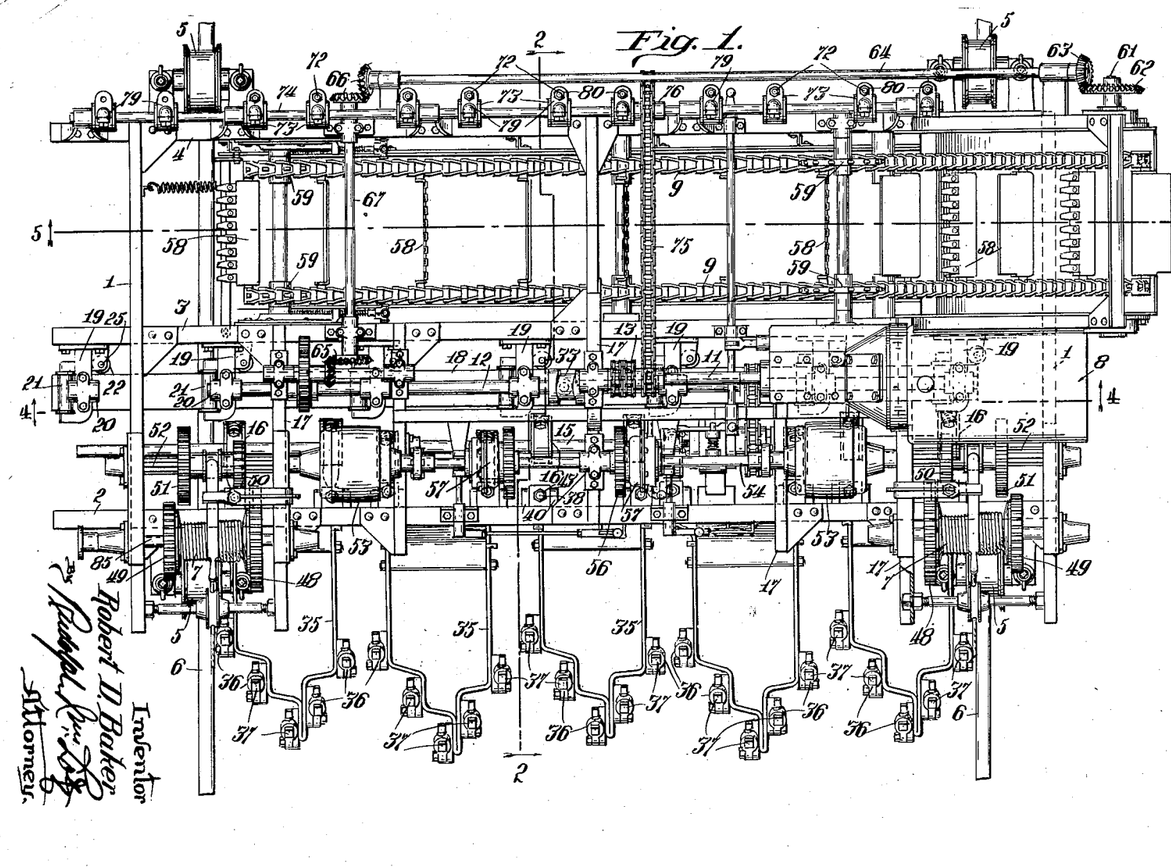
Fig. 1 is a plan view of a fine-grading machine constructed in accordance with the invention.

The several pairs of eccentrics 16 are so arranged on the shaft 15 as to cause the respective sets of scarifiers 37 to be at different points in their movements at all times, as is indicated in Fig. 1.

In the instance illustrated there are five sets of said scarifying devices on the machine. The two outermost sets thereof may operate in unison and so also the next inner sets, but the latter should attain the forward limit of their movement when the outermost sets have attained a position adjacent the rearward limit of motion, the middle set being them at a point intermediate the positions of the other two sets of said scarifiers. A relatively short, choppy stroke is preferably applied to the scarifiers so that each earth penetrating movement thereof will be only a short distance ahead of the preceding penetrating stroke thereof as this will enable them to break the earth more easily than if a long stroke were imparted thereto.

Each set of scarifiers 37 comprises five members which are spaced from each other longitudinally and laterally of the arms 35. The furrows cut by said members 37 are thus spaced from each other and would, in some soils, leave fairly compact earth masses between said furrows.

To break up these earth masses and also to balance better the movements of the arms 35 and the stresses on the shaft 15, I provide earth penetrating members 46 disposed in staggered relation to the scarifiers 37. The said members 46 are mounted in sockets 47 secured to the elbows connecting the arms 34 and 35 and are triangular in cross-section so that, as they penetrate the earth left between the said furrows, they will split the same and, consequently, break them up.

The members 37 and 46 are preferaby arranged to penetrate the earth to a depth below the plane of operation of the cutting blades 29 so that the latter will have very little hard earth to cut into.

In instances where the earth to be penetrated by the scarifiers 37 is very hard or tough, the compression springs 41 will cause the same to press yieldingly into the earth and will merely change the normal path of movement of the cutting edges of said scarifiers from surface to depth to a more gradual penetration. The short stroke above referred to will make each cut of a scarifier 37 begin at a point in the soil surface a very short distance in advance of the previous cut and thus the action of the scarifiers will become similar to that of a squirrel's teeth in gnawing through the shell of a hickory nut, the successive cuts being also governed by the speed of travel of the machine as to the thickness of what may be termed the "shavings" removed by the scarifiers. Thus, if the speed of rotation of the shaft 15 is one hundred twenty R. P. M. and the machine travels three feet per minute, the scarifiers will make one hundred twenty cutting strokes in thirty-six inches and thus lengthen the furrows cut thereby a bit more than one-third of an inch at each penetrating stroke. If the speed of travel is six feet per minute, then the scarifiers will lengthen their furrows about seven-tenths of an inch per stroke.

It will thus be seen that the scarifiers will not suffer severe strains or stresses and will divide finely the earth cut thereby and provide lines of planes of cleavage bordering the earth mounds between the furrows which make it very easy for the members 46 to break up the said mounds thoroughly.

By reference to Fig. 1, it will be seen that the cable wind-up drums 7 are provided with a large diameter driving spur-gear wheel 48 and a smaller gear wheel 49 to mesh, respectively with gears 50 and 51 slidable on shafts 52 which constitute the low-speed shafts of planetary speed reducers 53. The high-speed shaft 54 of said speed reducers is geared to the shaft 15 by means of the spur-gears 55 and 56 (Fig. 2). The shaft 54 is composed of three sections, the middle section carrying the gear wheels 56 and, at its ends, carrying members of friction clutches 57 by means of which the middle section is associated with and disassociated from the end sections of said shaft.

Figures 3, 9, 10, 11:
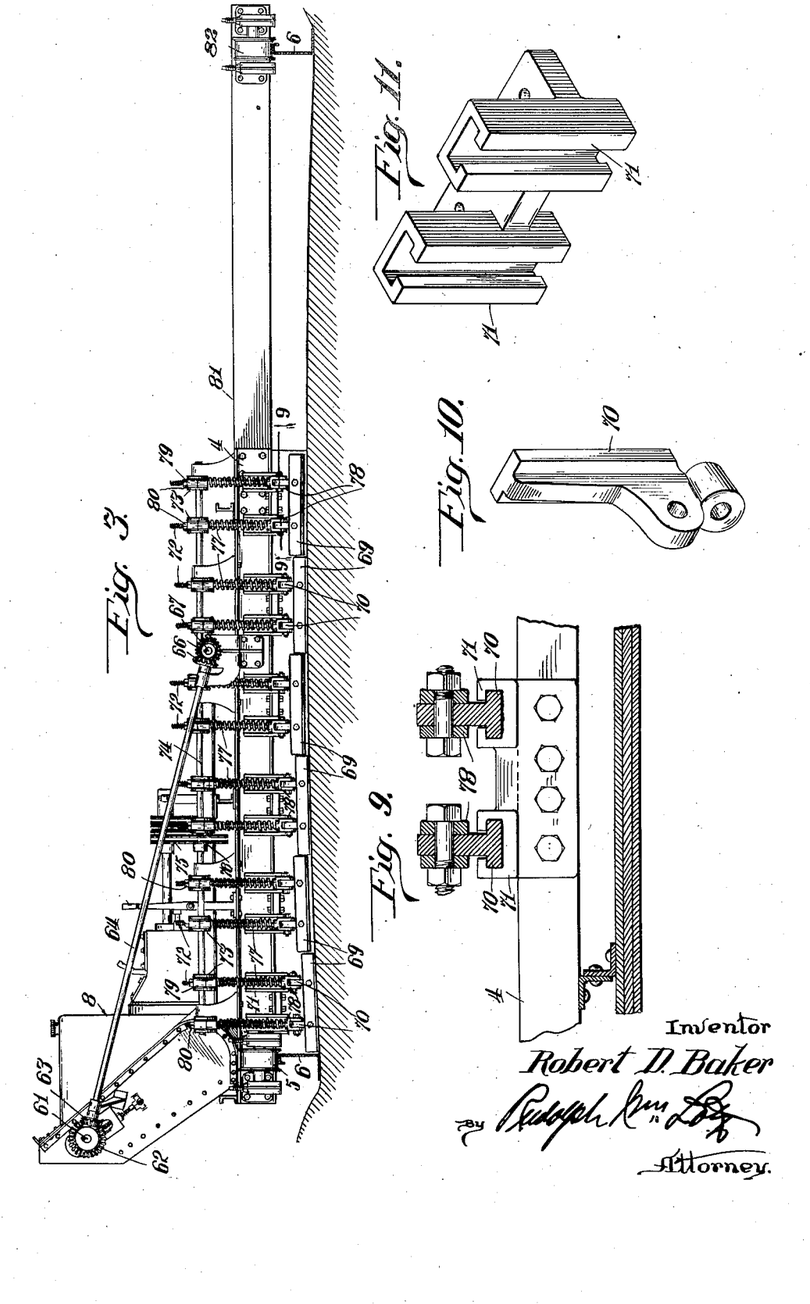
Fig. 3 is a rear elevation of the same.
Fig. 9 is a fragmentary plan section on the line 9—9 of Fig. 3.
Figs. 10 and 11 are perspective views of a tamper carrying member and a slide-bearing member for the same, respectively.
Figures 5, 13:
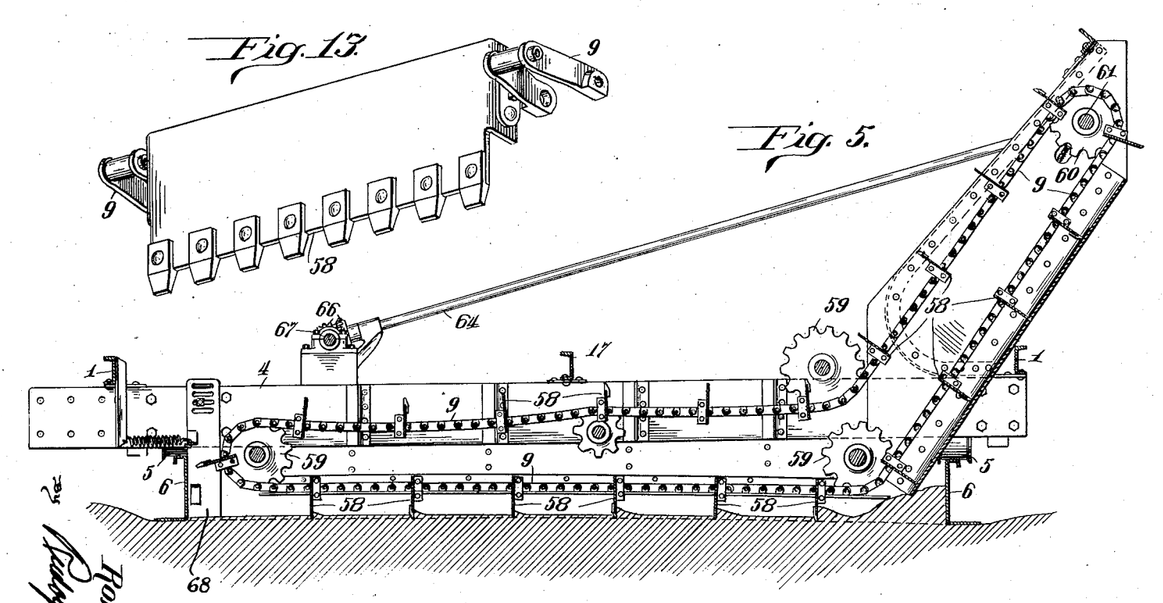
Fig. 5 is a vertical transverse section of the same on the line 5—5 of Fig. 1.
Fig. 13 is a detail perspective view showing an earth conveyor plate of the machine.
Figure 6:
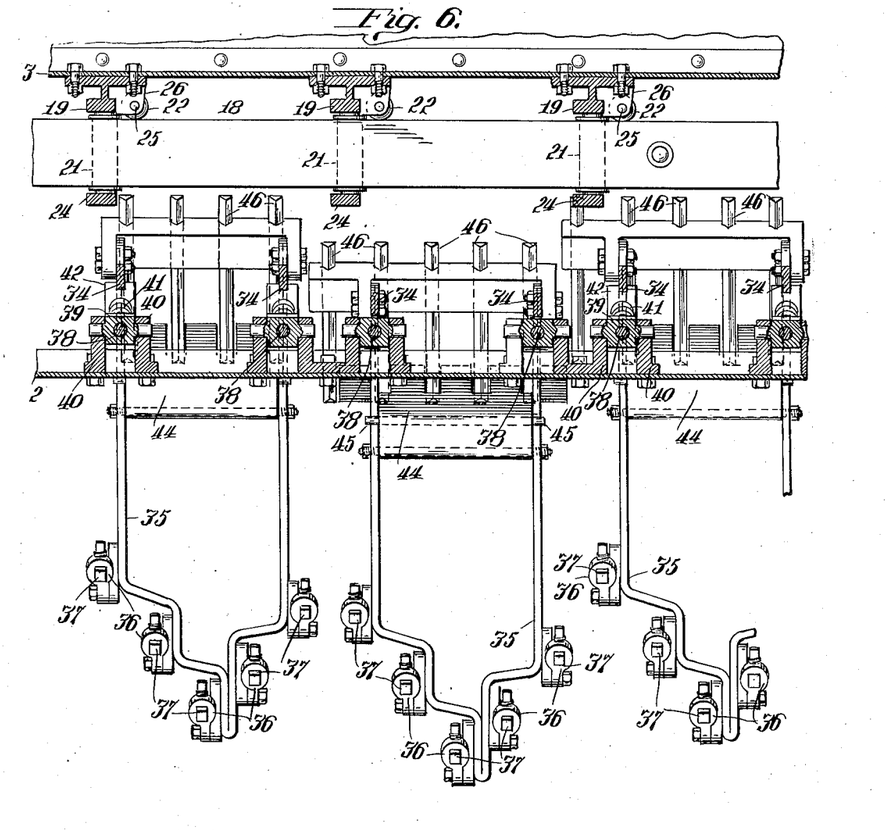
Fig. 6 is a plan section on the line 6—6 of Fig. 2, some parts of the mechanism being omitted.

The earth which is loosened by the scarifiers 37 and the members 46, and also by the cutting blades 29, passes over the shoes 28 and is thus disposed in the path of the blades 58 of the earth conveying and elevating mechanism which includes the sprocket chains 9 and the sprocket wheels over which the chains 9 are trained, as shown in Fig. 5. The series of sprocket wheels includes several idlers 59 and the drive wheels 60 on the drive shaft 61 which is equipped with a bevel-gear wheel 62 (Fig. 3). The latter meshes with the bevel pinion 63 on the shaft 64 which is driven from the shaft 12 by means of bevel gearing 65 and 66 and shaft 67.

This last-mentioned mechanism and the earth compacting and smoothing members 10 disposed behind the same and, also, the devices 68 for moving loose earth inwardly from the side-forms and into the path of the blades 58, constitute, per se, no part of the present invention as the same fall within the comprehension of the aforesaid pending application Serial No. 580,541.

In practice, it is preferable to cause the cutting blades 29, the scarifiers 37 and members 46 to cooperate to remove the earth layer overlying the ultimate fine-grade plane to a depth of one-quarter to one-half inch below the said plane and to so dispose the blades 58 as to cause the conveyor to remove loose earth to a level appreciably above said plane, and also to dispose the smoothing and compacting members 10 to a position higher than the said plane but below the level of the loose earth so as to leave sufficient earth behind the machine frame to be compacted by the tampers 69 to the exact level of the ultimate fine-grade plane.

The said tampers 69 are mounted upon the lower ends of pairs of plungers 70 (Fig. 10) which are slidable in the guide members 71 (Fig. 11) mounted upon the rear channel bar 4 of the frame. Plunger rods 72 suitably associated with eccentrics 73 on a shaft 74, are pivotally connected with the plungers 70. The shaft 71 is geared to the engine shaft by means of chain and sprocket wheel gearing 75—76. Compression springs 77 are interposed between the heads 78 of said plunger rods 72 and the bearings in the eccentric straps 79 in which said plunger rods 72 are slidable for adjustment by means of the nuts 80. The said spring constitutes cushioning means to prevent undue strain on the shaft 71 in the event that a tamper 69 should strike a stone or the like.

In the construction of the average highway of a width of twenty feet or more, the practice in many localities is to pave one-half the pavement strip first, so that the other half thereof may be left open for the passage of material trucks from supply depots to the concrete mixer and, upon completion of one-half the pavement, proceed with the other half thereof by reversing the direction of travel of the mixer.

In some instances, if the width of road shoulder permits, or a narrow-gauge railway equipment is used in place of trucks, the half of the pavement strip not being paved is left open for public traffic and, upon completion of the first-half of the pavement, the latter is left open for public use while the other half is being paved.

In the accompanying drawings I have illustrated the fine-grading machine as of a width equal to about one-half the width of the pavement strip and as supported upon side-forms 6, one of which is mounted upon the middle of the pavement strip and upon the crown of the ultimate fine-grade, as a machine of this width is adapted for the type of procedure above mentioned.

Figure 15:
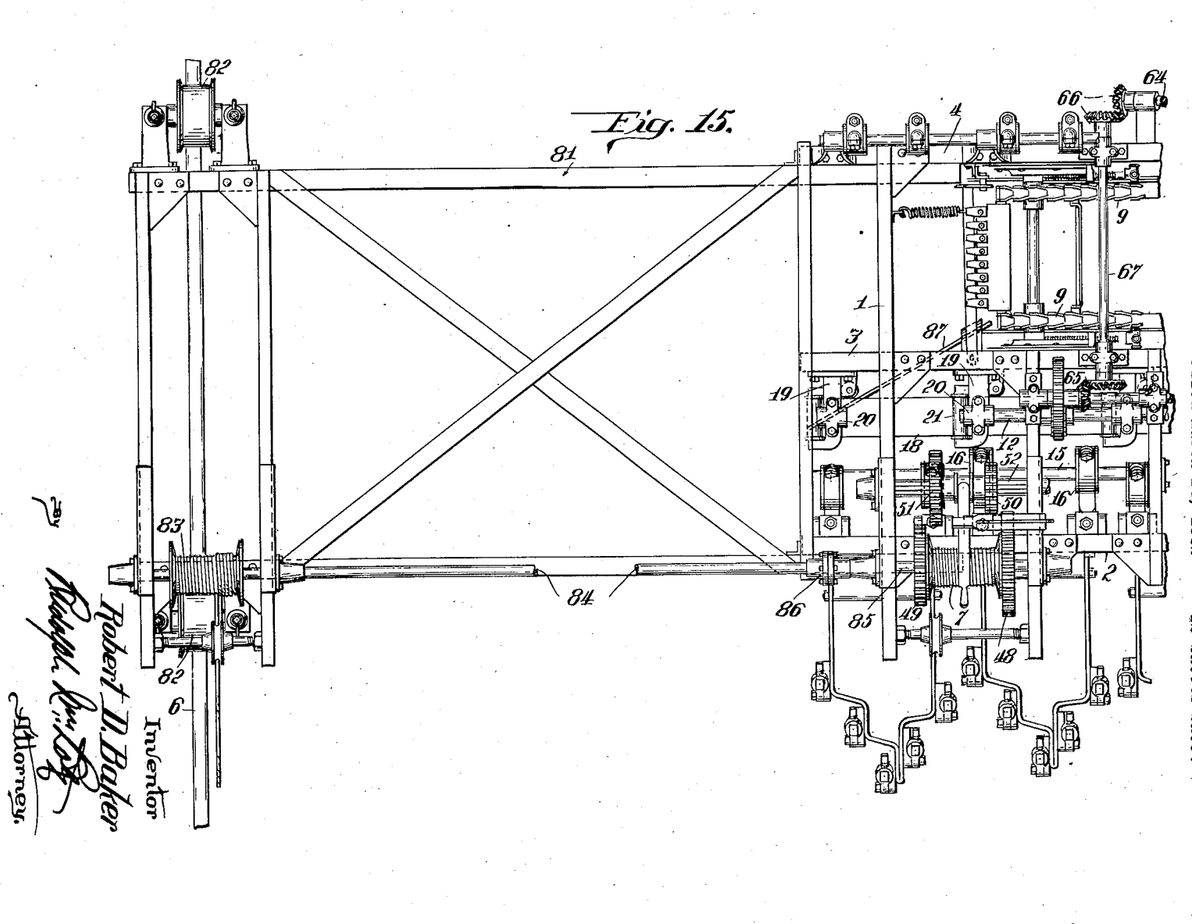
Fig. 15 is a fragmentary plan view of the machine showing an extension frame mounted thereon (also shown in Fig. 3) to be used under certain conditions.

In Figs. 3, 4, 5, 15, and 16, I have shown the machine frame as equipped with means for attaching an extension frame 81 to the machine frame, said extension frame being shown in Figs. 3 and 15.

This said extension frame 81 is equipped with wheels 82 to ride upon the side-form at the extreme other side of the full-width pavement strip, and with a cable wind-up drum 83, the shaft 84 thereof being coupled with the shaft 85 of one of the drums on the main frame by means of the shaft coupling 86.

Figure 4:
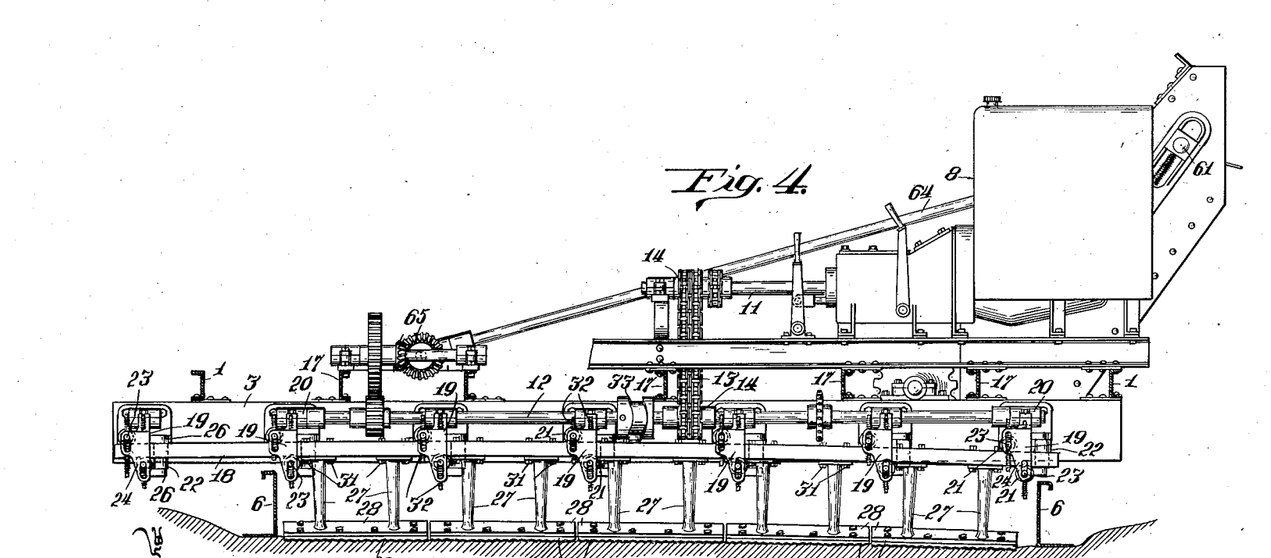
Fig. 4 is a vertical transverse section of the same on the line 4—4 of Fig. 1.
Figure 16:
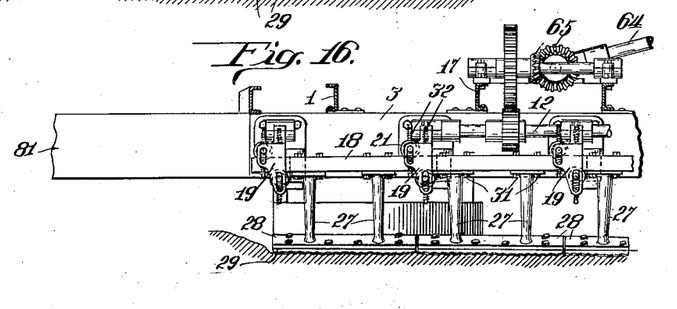
Fig. 16 is a fragmentary detail vertical sectional view, similar to Fig. 4, of the middle portion of the machine shown in Fig. 15.

The main frame channel-bars 2, 3, and 4, and the channel-bar 18, extend beyond the limit of the machine as the normal required width of the machine as shown in Fig. 4. The shaft 15 also extends sufficiently far to receive another pair of eccentrics 16 and a carrier 34—35 for the members 37 and 46, the channel-bar 18 being also of sufficient length to receive another earth-cutting set, 27, 28, and 29, as shown in Figs. 15 and 16, and also in Fig. 3. The width of the fine-grade cut by the machine when equipped with the extension frame 81 is thus greater than one-half the width of the pavement strip.

A scraper plate 87 is disposed behind the additional earth cutting set 27, 28, 29 at an angle to move loose earth into the path of the conveyor blades 58.

The said additional earth scarifying and cutting sets function to provide a path upon which side forms may be set, if desired, for the purpose of laying pavement over one-half of the pavement strip, the fine-grading of the latter being performed coincidentally with the formation of the path to receive the middle form at less cost than the cutting of this additional path could otherwise be performed.

This mode of operation is somewhat advantageous under certain specific conditions which need not be described herein.

The advantage incident to widening the machine frame to receive the additional earth manipulating devices, as last described, lies in the the fact that it permits the machine to be used, for example, to fine-grade one-half of a pavement strip twenty-two or twenty-four feet wide instead of only twenty feet wide by adding an extension frame 81 of required width to extend the total span of the frame to twenty-two or twenty-four feet. Obviously, the earth conveying and elevating mechanism of the machine may be lengthened by moving the sprocket wheels and the bearings for the shaft thereof to the left of the position shown in Fig. 5 and adding the required number of links to the chains 9.

In Figs. 17 to 23 inclusive, the invention is illustrated as embodied in a machine adapted for travel on a strip to be graded as distinguished from a machine adapted for travel on side-forms.

Figure 17:
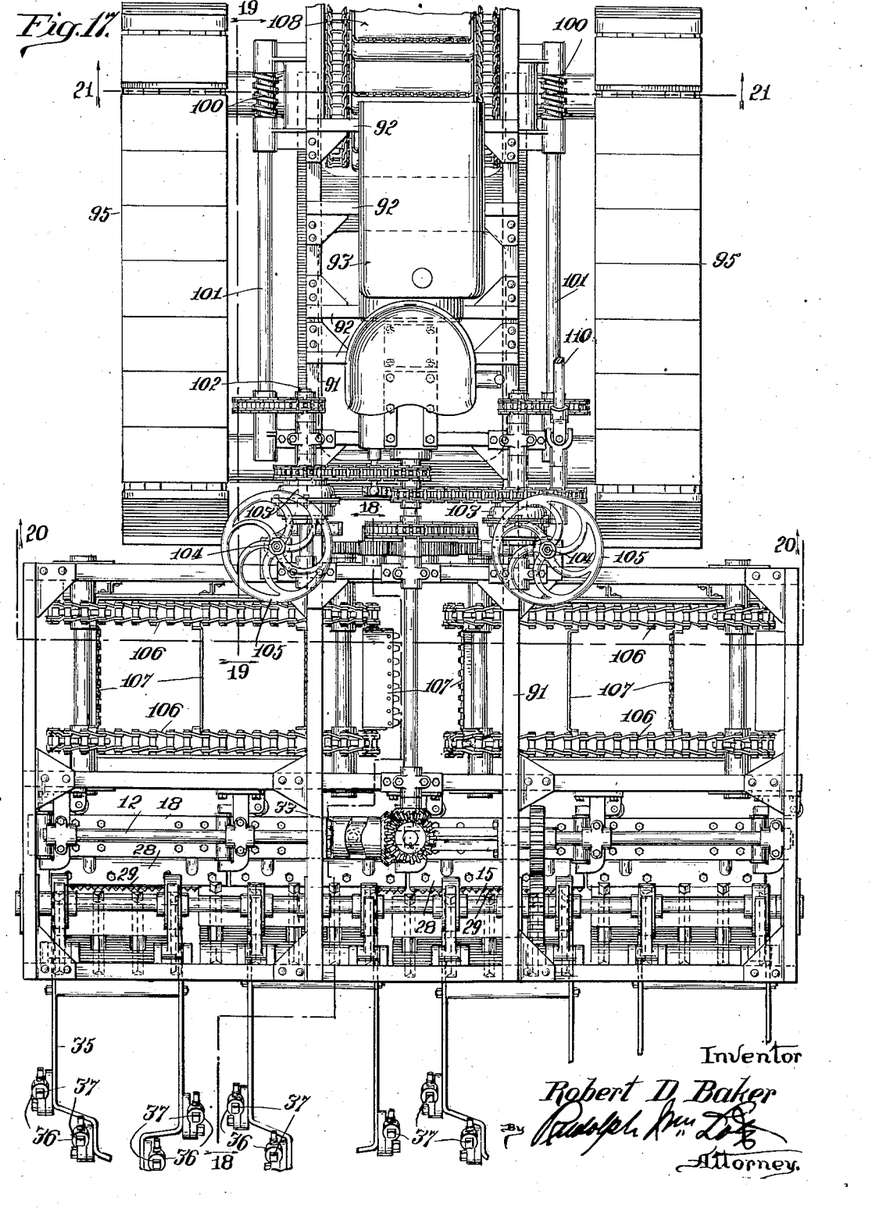
Fig. 17 is a plan view of a machine embodying the invention in a structure adapted for travel on the ground as distinguished from travel on side-forms and arranged to cut its own path.
Figure 18:
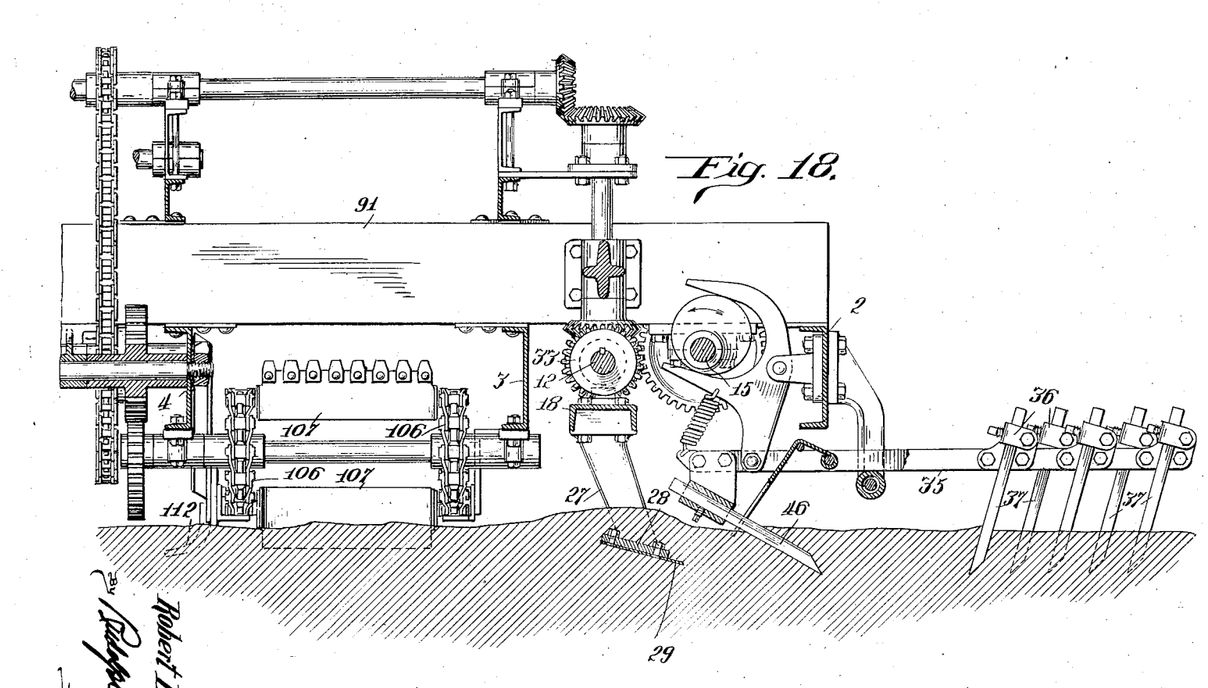
Fig. 18 is a vertical longitudinal section of the same on the line 18—18 of Fig. 17.
Figure 19:
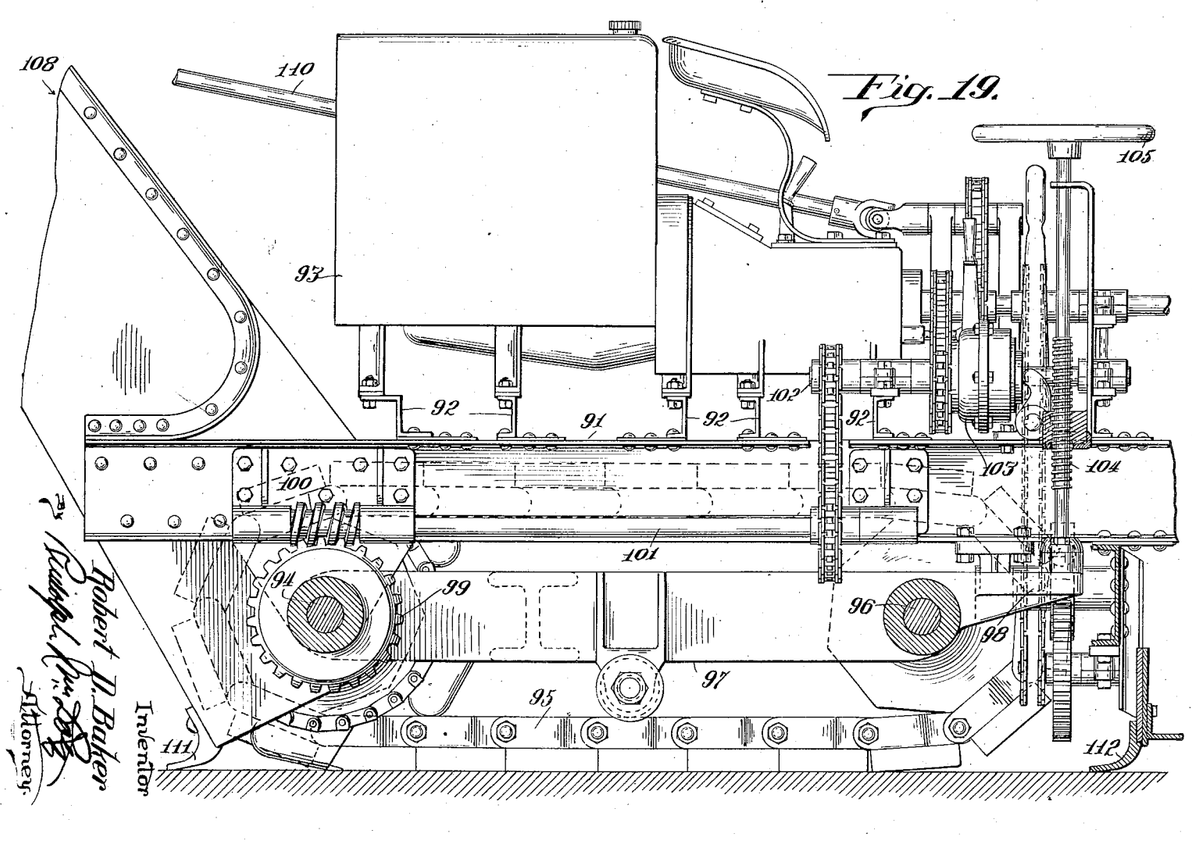
Fig. 19 is a vertical longitudinal section of the same on the line 19—19 of Fig. 17.
Figure 20:
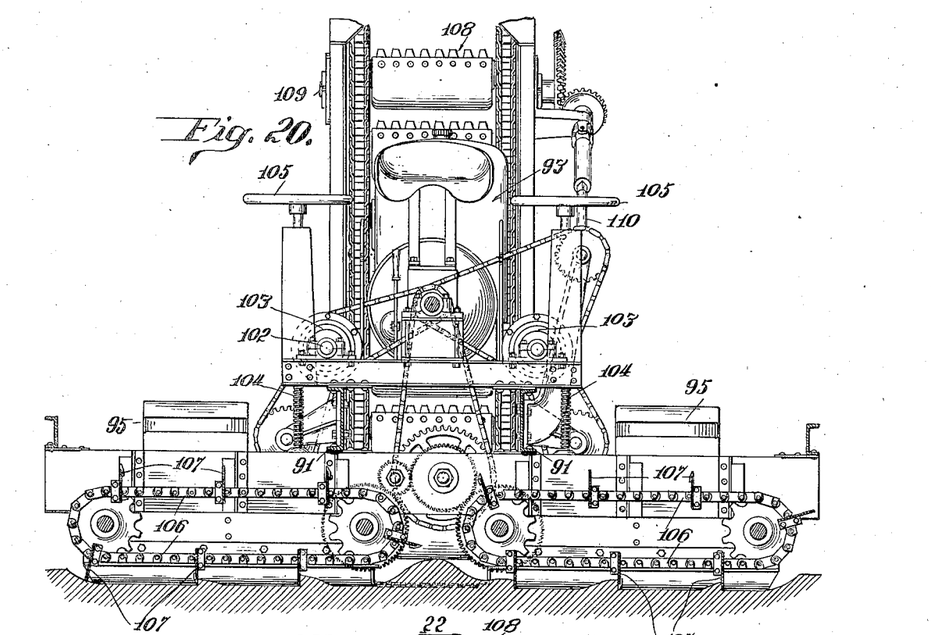
Fig. 20 is a vertical transverse section of the same on the line 20—20 of Fig. 17.
Figure 21:
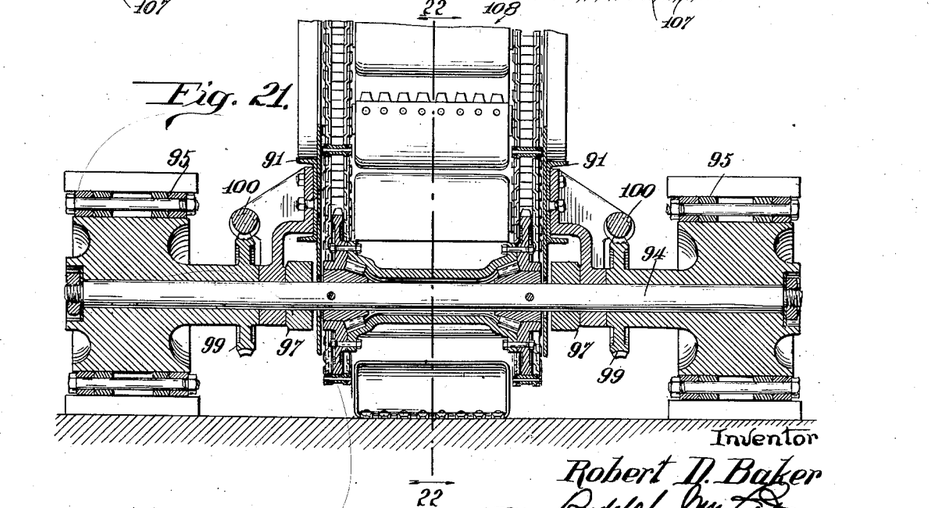
Fig. 21 is a vertical transverse section of the same on the line 21—21 of Fig. 17.
Figures 22, 23:
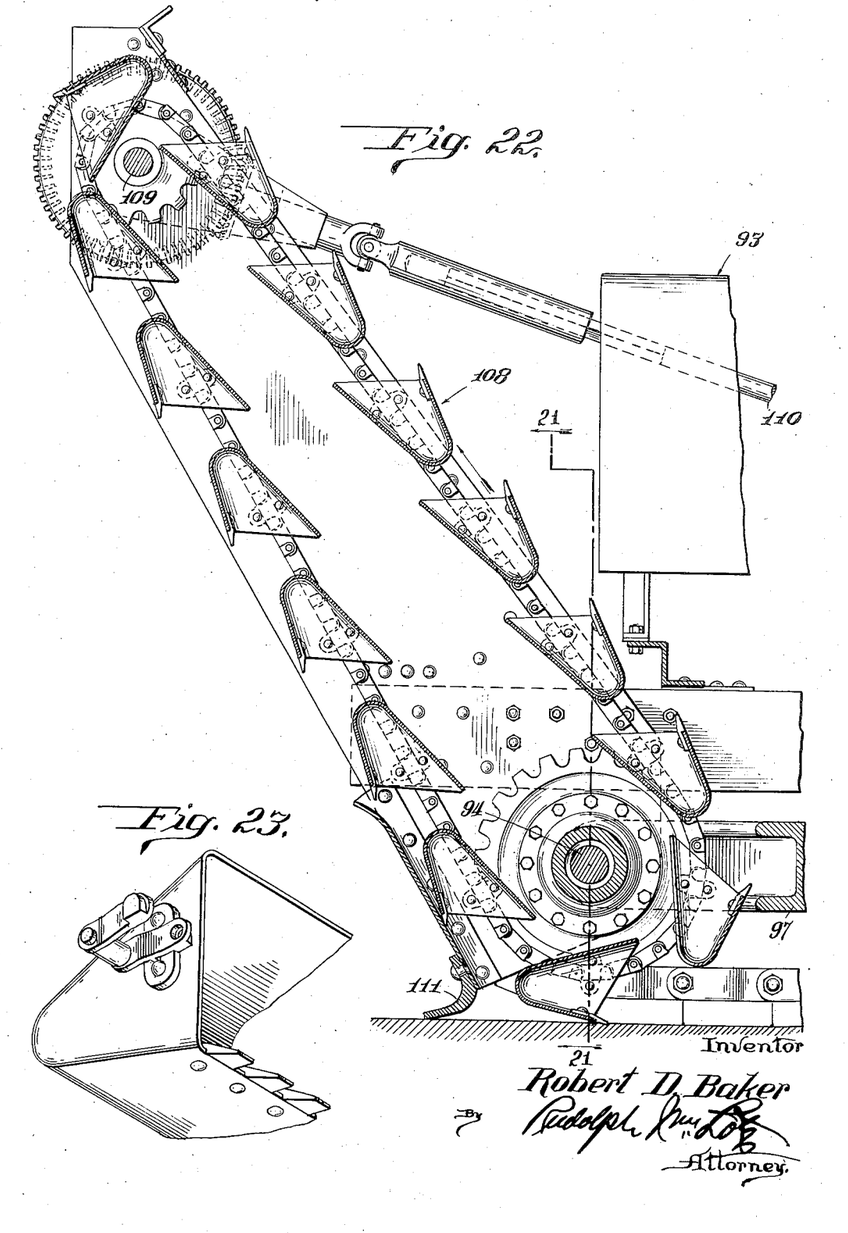
Fig. 22 is a fragmentary vertical longitudinal section of the machine on the line 22—22 of Fig. 21.
Fig. 23 is a fragmentary perspective view of a bucket of the elevator of the machine.

In this machine the earth scarifying, breaking and cutting mechanisms are identical with those shown in Figs. 1 to 16 inclusive. Said mechanisms are mounted upon the forward end portion of a suitable frame, the said forward end portion being substantially identical in construction with the frame of the machine shown in Figs. 1 to 16, inclusive.

The said frame of the machine shown in Figs. 17 to 23 inclusive includes a rear end portion having side rails 91 and suitable cross-pieces 92 upon which the engine 93 is mounted.

The said side rails 91 are mounted upon a shaft or axle 94 upon which the rear wheels of a pair of tractor chain units 95 are rotatably mounted. The front wheels of the said units are rotatably mounted on the shaft or axle 96.

The said shafts or axles 94 and 96 are mounted in the frame disposed between the said units 95 and which includes the side-bars 97 having forward projections 98.

The rear wheels of the units 95 are rigid with worm-wheels 99 meshing with the worms 100 on the shafts 101 journalled in bearings on the side-rails 91.

The shafts 101 are suitably geared to the engine 93 by means of countershafts 102, which are suitably geared to the said shafts 101. Friction clutches 103 permit the operator to cause the said shafts 101 to be rotated independently of each other or in unison to effect steering of the machine in a well-known manner.

The forward end portions of the side-rails 91 and the rear transverse frame member of the front portion of the frame which carries the earth manipulating mechanisms, are equipped with threaded bearings for the screw-shafts 104, the lower ends of which bear upon the projections 98 of the side-bars of the tractor frame and are manually rotatable by means of the hand-wheels 105 for raising and lowering the forward portion of the frame carrying said earth manipulating mechanisms relatively to the plane of the treads of the units 95. The latter are arranged to travel upon the grade cut by the said earth manipulating mechanisms which extend beyond the vertical planes of the outer sides of the said units 95 as shown in Fig. 17.

In the instance illustrated, the earth conveying mechanism of the said machine comprises two separate conveyors consisting of sprocket chains 106, sprocket wheels, and the blades 107, the said conveyors being operated to move loose earth to form a windrow or mound thereof which is disposed midway between the paths of travel of the units 95 and in the path of the bucket elevator 108 mounted upon the rear end of the frame of which the side-rails 91 form a part.

The sprocket wheels at the lower end of the bucket elevator 108 are rotatable on the shaft or axle 94. The shaft 109 of the bucket elevator 108 is suitably geared to the shaft of the engine 93 by means including the shaft 110.

A strike-off and smoothing and compacting bar 111 at the rear end of the machine serves to maintain an earth mound within the path of travel of the elevator buckets in the event that loose earth should escape the successive action of the buckets of the elevator, as by spilling or otherwise.

Strike-off members 112, which act also to compact and smooth loose earth which may escape the conveyor blades 107, are disposed in the paths of the tractor units 95 and serve to maintain surplus loose earth within the path of the said conveyor blades.

The bucket elevator may deliver the loose earth into a trailer or upon a laterally disposed conveyor belt disposed to receive the said loose earth and deliver the same to one side of the graded strip. This type of conveyor is commonly used in earth moving machinery and, therefore, is not illustrated herein.

It will also be obvious that an earth conveyor and elevator of the type shown in Figs. 1 to 16, inclusive, may be substituted for the conveyors 106—107, and the said bucket elevator omitted.

The machine illustrated in Figs. 17 to 23, inclusive, may be employed for ordinary earth leveling purposes in connection with wagon graders and other surfacing equipment which is more particularly adapted for moving loose earth than cutting down compact earth.

In the operation of this last-mentioned embodiment of the invention, the operator may maintain the earth manipulating mechanism in a predetermined grade plane by means of a suitable guide such as a chalk-line disposed at one side of the grade-strip to be cut or by means of a sighting-bar, or the like, and successive targets disposed in advance of the machine, by manipulating the hand-wheels 105 to raise and lower the said mechanisms as required. As the machine necessarily travels very slowly, an almost perfect grade may be cut thereby in a single passage unless predetermined grade is at too great depth below the surface to permit this or the topography is of a rolling character requiring deep cuts at intervals and appreciable filling-in at others.

It will be understood, of course, that the specific type and relative arrangement of the earth scarifying devices 37 and the undercutting devices 46 may be changed and varied to suit different soil conditions without departing from the invention.

It will also be understood that the position of the earth moving plates 44 relatively to the shoes 28 of the earth cutting means may be changed and that other earth moving devices may be substituted for the said plates 44 without departing from the invention.

It is contemplated also to use the type of earth cutting means illustrated and described in my copending application, Serial No. 580,541, in place of the cutting mechanism comprising the channel-bar 18 and the arms 27, shoes 28 and blades 29 hereinabove described.

The efficiency of the machine will be best appreciated if it is assumed that a trench has been dug to the depth of the ultimate grade plane for the machine of Figs. 17 to 23 inclusive, or to the depth of the plane of operation of the cutting edges of the plates 29 of the machine of Figs. 1 to 16, inclusive, said trench extending the full width of the grade or pavement strip and being of a length slightly greater than that of the machine from the forward limit of strokes of the scarifiers 37 to the hindmost part of the machine.

This assumed trench will present a shoulder of earth opposed to the front of the machine and the vertical or substantially vertical plane of this shoulder affords a plane of cleavage offering very little resistance to breaking away the earth of said shoulder.

As the machine moves forward, the foremost scarifiers 37 first act to cut into said shoulder, then the next pairs and then the innermost pairs of said scarifiers attack it and break it down. Thus, a series of short, closely spaced furrows are cut before the undercutting devices 46 attack the said shoulder at points alternated with the furrows, the latter providing planes of cleavage bordering the earth mounds disposed between the furrors.

If the speed of travel of the machine is assumed to be seven feet (84 inches) per minute and the speed of rotation of the shaft 15 is assumed to be 120 R. P. M., then each stroke of each scarifier will cut slightly more than two-thirds of an inch of furrow, which is, obviously, a matter of ease for sharp and narrow teeth even though the soil is hard and tough. In such soils, the scarifiers will not cut furrows of a width equal to that of each tooth, but will break away lumps of the earth so that it is doubtful whether the undercutting devices 46 are required to function more than at intervals, depending of course upon the distance separating the paths of action of the teeth 37. If the latter are widely spaced apart, for example, eight to ten inches, then the members 46 will, doubtless, function continuously.

It will also be apparent that the members 46 or equivalents thereof, operating at relatively high speed as compared to the speed of travel of the machine, will break up an earth layer with ease to the extent necessary to enable remaining firm earth disposed between the paths of operation of said members, to be very easily cut away by secondary mechanism disposed behind said members.

The speed of travel of the machine is determined by the depth of the earth layer to be removed as the capacity of the earth conveying and elevating mechanism is necessarily limited to a certain cubic volume per lineal foot of pavement strip. Hence, in instances where this earth volume is such as permits rapid travel of the machine, the earth layer to be penetrated is necessarily shallow and more easily penetrated and broken.

From the foregoing description of the machine illustrated in Figs. 1 to 16 inclusive, it will be apparent that the invention also involves a novel method of effecting the fine-grading of the pavement strip in that it involves the initial step of cutting longitudinal furrows in said strip which border parallel, longitudinal earth mounds or windrows of a compact nature which are partly broken by the undercutting members 46. The resulting earth surface thus presents a fairly leveled contour, if all loose earth were removed therefrom, wherein the furrows of uniform depth alternate with irregular rows of projecting earth lumps. This surface may be defined as roughly leveled.

These rows of projecting earth humps are cut down to the level or plane of operation of the cutting edges of the plates 29 and this plane of operation may be coincident with the bottoms of the said furrows, or very slightly above or below the latter.

The earth conveying and elevating mechanism then removes all except enough of the loose earth to provide a substantially uniform level thereof overlying the grade plane formed by the advance mechanisms, to be compressed and compacted to the exact level of the predetermined fine-grade plane by the compacting and compressing means at the rear end of the machine.

This method differs from that described and claimed in my said co-pending application, Serial No. 580,541 in that it includes the initial steps performed by the scarifiers 37 or undercutting devices 46, or both, the succeeding steps being substantially identical with those defined by the method claims of the last-mentioned pending application except that in the instant case, the member 10 partially compacts the loose earth left by the earth conveyor to a level above that to which the tampers 69 reduce it.

Pavement grades generally present a transverse contour or profile, which includes a middle crown portion and flat side portions and sometimes a flat middle portion and inclined side portions. Hence the word "plane" as used in this specification is to be construed to include a flat plane or the profile of the grade, as the case may be.

I claim as my invention:

1. In a grading machine, a carriage, mechanism at the front thereof for scarifying and breaking up the layer of earth overlying the ultimate grade to a predetermined depth, said mechanism having a forward and back movement and including devices operating to cut furrows during backward movement of the said mechanism, and devices for penetrating said earth layer during forward movement of said mechanism, an engine on the carriage for propelling the latter, and gearing between said engine and said mechanism for actuating the latter.

2. In a grading machine, a carriage, mechanism at the front thereof for scarifying and breaking up the layer of earth overlying the ultimate grade to a predetermined depth, said mechanism having a forward and back movement and including devices operating to cut spaced apart parallel furrows during backward movement of the said mechanism, and devices for penetrating the said earth layer between the said furrows during forward movement of said mechanism, an engine on the carriage for propelling the latter, and gearing between said engine and said mechanism for actuating the latter.

3. In a grading machine, a carriage, mechanism mounted on said carriage for scarifying and breaking an earth layer to be removed, said mechanism including devices penetrating the earth layer from its surface to a predetermined depth and devices for penetrating the earth layer along the bottom thereof and passing upwardly therethrough, an engine on the carriage for propelling the latter, and gearing between said engine and said mechanism for actuating the latter.

4. In a fine grading machine, a carriage adapted for forced travel over a strip to be graded, power actuated means on said carriage for undercutting the earth layer to be removed along a predetermined plane below the surface of said layer, and power actuated earth scarifying means disposed in advance of said undercutting means and arranged to penetrate said layer from the surface thereof to a predetermined depth and effect said scarifying in a direction opposed to the direction of travel of said carriage, said scarifying means having a forward and back movement relatively to said carriage and being inactive during said forward movement, and means associated with said scarifying means for undercutting and breaking up the earth layer during the forward movement thereof.

5. In a fine grading machine, a carriage adapted for forced travel over a strip to be graded, power actuated means on said carriage for undercutting the earth layer to be removed along a predetermined plane below the surface of said layer, and power actuated earth scarifying means disposed in advance of said undercutting means and arranged to penetrate said layer from the surface thereof to a predetermined depth and effect said scarifying in a direction opposed to the direction of travel of said carriage, said scarifying means having a forward and back movement relatively to said carriage and being inactive during said forward movement, and means associated with said scarifying means for undercutting and breaking up the earth layer during the forward movement thereof, said last-mentioned undercutting means being arranged in staggered relation to the scarifying elements of the scarifying means.

6. In a fine grading machine, the combination with power actuated means for progressively undercutting an earth layer along a predetermined grade plane, of power actuated means disposed in advance of said undercutting means and having a forward movement relatively thereto over the earth layer followed by downward, backward, and upward movements, said advance means equipped with teeth for penetrating the earth layer from the surface thereof to a predetermined depth during downward and backward movement for scarifying said layer at intervals longitudinally of said layer, said advance means being equipped also with teeth disposed in staggered relation to the first-named teeth for penetrating the earth layer during the forward and upward movement of said advance means.

7. In a fine grading machine, the combination with power actuated means for progressively undercutting an earth layer along a predetermined grade plane underlying the surface of said layer, of power actuated toothed means disposed in advance of said undercutting means for progressively scarifying the earth layer to a predetermined depth relatively to the said grade plane, and devices operatively associated with said toothed means for breaking up the said earth layer from a predetermined depth relatively to the said grade plane toward the surface of the said layer.

8. In a fine grading machine, the combination with power actuated means for progressively undercutting an earth layer along a predetermined grade plane underlying the surface of said layer, of power actuated toothed means disposed in advance of said undercutting means for progressively scarifying the earth layer to a predetermined depth relatively to the said grade plane, and devices operatively associated with said toothed means for breaking up the said earth layer from a predetermined depth relatively to the grade plane toward the surface of the said layer, the said devices operating in alternating relation to the said toothed means.

9. In a fine grading machine, the combination with power actuated means for progressively undercutting an earth layer along a predetermined grade plane underlying the surface of said layer, of power actuated toothed means disposed in advance of said undercutting means for progressively scarifying the earth layer to a predetermined depth relatively to the said grade plane, and devices operatively associated with said toothed means for breaking up the said earth layer from a predetermined depth relatively to the grade plane toward the surface of said layer, the said devices operating in alternating relation to the said toothed means and penetrating the earth at points disposed in staggered relation to the earth cuts made by the said toothed means.

10. In a fine grading machine, a carriage adapted for travel along a pavement strip, earth cutting means mounted on said carriage and presenting a cutting edge extending substantially over the entire width of the said strip and disposed in substantially the plane of the ultimate grade, power actuated mechanism engaged with the said means for reciprocating the same transversely of the pavement strip during travel of the said carriage, and devices for effecting vertical adjustment of said means relatively to the carriage and for effecting adjustment thereof to cause the said cutting edge to correspond in shape substantially with the contour of the ultimate grade plane transversely of the strip.

11. In a fine grading machine, a carriage adapted for travel along a pavement strip, earth cutting means mounted on said carriage and presenting a cutting edge extending substantially over the entire width of the said strip and disposed in substantially the plane of the ultimate grade, power actuated mechanism engaged with the said means for reciprocating the same transversely of the pavement strip during travel of the said carriage, and power actuated devices for breaking up the earth layer overlying the plane of cut effected by said means in advance of the latter, said means and devices being vertically adjustable relatively to the carriage each independently of the other to vary the depth of operation thereof relatively to the plane of travel of the carriage.

12. In a fine grading machine, a carriage, a substantially continuous earth cutting means disposed substantially transversely of the direction of travel of the said carriage and adjustable to the carriage to bring the cutting edge of said means into a predetermined plane underlying an earth layer to be removed, power actuated mechanism for reciprocating said means transversely of the direction of travel of the carriage, a series of rocking and reciprocable plungers equipped with earth breaking devices disposed in advance of said means and arranged to penetrate the earth layer to a depth below the cutting edges of said first named means and power actuated mechanism for actuating the said plungers.

13. In a fine grading machine including a carriage adapted for travel along a pavement strip, a series of groups of earth scarifying devices disposed at intervals over the width of space occupied by the said carriage, mechanism on the carriage for actuating the said devices to furrow longitudinally, the earth layer overlying the pavement strip to a predetermined depth, said mechanism including means for imparting a forward and back motion to the said devices and downward movement, thereof, during the stroke, thereof, opposite to the direction of travel of the carriage, said mechanism also including means for causing one group of said devices to effect a scarifying stroke while other groups, thereof, are at inactive points in their respective movements, a power actuated earth cutting blade disposed behind said scarifying devices, and earth conveying mechanism disposed behind said blade.

14. In a fine grading machine including a carriage adapted for travel along a pavement strip, a series of groups of earth scarifying devices disposed at intervals over the width of space occupied by the said carriage, mechanism on the carriage for actuating the said devices to furrow the earth layer overlying the pavement strip longitudinally of said strip to a predetermined depth, the said devices of each group being offset and spaced from each other laterally and longitudinally of the pavement strip, power actuated earth cutting blades disposed behind said devices and leaving their cutting edges disposed at a level above the depth of furrows produced by said devices and earth conveying means arranged for cooperation with said blades and devices to remove excess loose earth from said strip.

15. In a fine grading machine of the type specified, an arcuate member reciprocable transversely of the direction of travel of the machine, bearings for said member disposed at intervals between the ends, thereof, earth cutting means rigid with said member, and power-actuated mechanism for actuating said member.

16. In a fine-grading machine of the type specified, an arcuate member reciprocable transversely of the direction of travel of the machine, bearings for said member disposed at intervals between the ends, thereof, earth cutting means rigid with said member, power-actuated mechanism for actuating said member, said member being flexible for varying its curvature, and means associated with the bearings for said member for flexing the same to vary its curvature.

17. In a machine of the kind specified, a carriage, traveling supporting means for the same, earth cutting mechanism on the carriage, means for raising and lowering the carriage relatively to the supporting means to vary the level of operation of the said cutting means relatively to the plane of travel of the supporting means during travel of the machine, and earth conveying mechanism disposed behind the cutting mechanism and in advance of the said traveling means for moving loose earth out of the path of the latter and into the middle of the grade cut by said cutting mechanism.

18. In a machine of the kind specified, a carriage, traveling supporting means for the same, earth cutting mechanism on the carriage, means for raising and lowering the carriage relatively to the supporting means to vary the level of operation of the said cutting means relatively to the plane of travel of the supporting means during travel of the machine, and earth conveying mechanism disposed behind the cutting mechanism and in advance of the said traveling means for moving loose earth out of the path of the latter and into the middle of the grade cut by said cutting mechanism, and a bucket elevator disposed behind said conveying mechanism for removing said loose earth from the middle of said grade.

19. The method of fine-grading a pavement strip which consists in breaking up earth disposed within the boundaries of the said strip to a predetermined depth below the level of the predetermined fine-grade contour along predetermined parallel paths extending longitudinally of the said strip to provide furrows within the said strip, cutting down ridges of firm earth remaining disposed between the said furrows to substantially the levels of the bottoms of the said furrows, then removing all loose earth except a sufficient layer thereof to provide a firm, compact fine-grade coinciding with the level of the predetermined fine-grade contour and effecting substantially uniform distribution of the said remaining loose earth to a level substantially parallel with and overlying the ultimate fine-grade contour, and then compressing and compacting said loose earth to the level of said fine-grade contour.

20. The method progressively of fine-grading a pavement strip which consists in first subjecting the earth layer overlying the predetermined fine-grade to the action of undercutting teeth disposed and operating substantially in the said grade and at spaced-apart intervals laterally of the pavement strip to penetrate said earth layer, imparting to the said teeth a reciprocatory motion and an up and down motion to cause the same to move in a direction opposite to the direction of the progressive grading while said teeth are embedded in earth, thereby to break up an earth layer to a depth below the predetermined grade, maintaining earth cutting means behind the said teeth and in a contour substantially coincident with that of the predetermined fine-grade and imparting thereto a lateral reciprocatory motion while advancing the same and said teeth along the pavement strip, removing surplus loose earth from said strip behind said cutting means, and then compacting and smoothing the remaining loose earth to the level and contour of the predetermined fine-grade.

21. The method of fine-grading a pavement strip which consists in first breaking up an earth layer overlying the predetermined fine-grade to a depth below the latter, removing a portion of the loose earth and leaving a sufficient uniformly distributed volume thereof disposed within the boundaries of said strip to provide a firm, compact and accurate fine-grade when compacted, and thereafter tamping and compacting said loose earth to the level of the ultimate fine-grade.

22. The method of fine-grading a pavement strip which consists in first breaking an earth layer overlying the ultimate fine-grade to a predetermined depth below the latter, then removing a portion of the loose earth and leaving a sufficient volume thereof disposed within the boundaries of said strip to fill the same compactly to the level of the said grade, and leveling the said loose earth remaining within the boundaries of the said strip to a level parallel with and above the said ultimate fine-grade, and then tamping and compacting said loose earth to the level of the said ultimate fine-grade.

23. The method of fine-grading a pavement strip which consists in first breaking an earth layer overlying the ultimate fine-grade plane to a predetermined level below and substantially parallel with the said plane, then removing a portion of the loose earth and leaving a sufficient volume thereof disposed within the boundaries of said strip to fill the same compactly to the level of the said plane, and leveling the said loose earth remaining within the boundaries of the said strip to the level of a plane parallel with and above the said ultimate fine-grade plane, and then tamping and compacting said loose earth to the level of the said ultimate fine-grade plane.

ROBERT D. BAKER.